Dec. 2, 1958   C. O. McKINNEY   2,862,798
FLUIDIZED CATALYST REGENERATION SYSTEM
Filed June 11, 1954   2 Sheets-Sheet 2

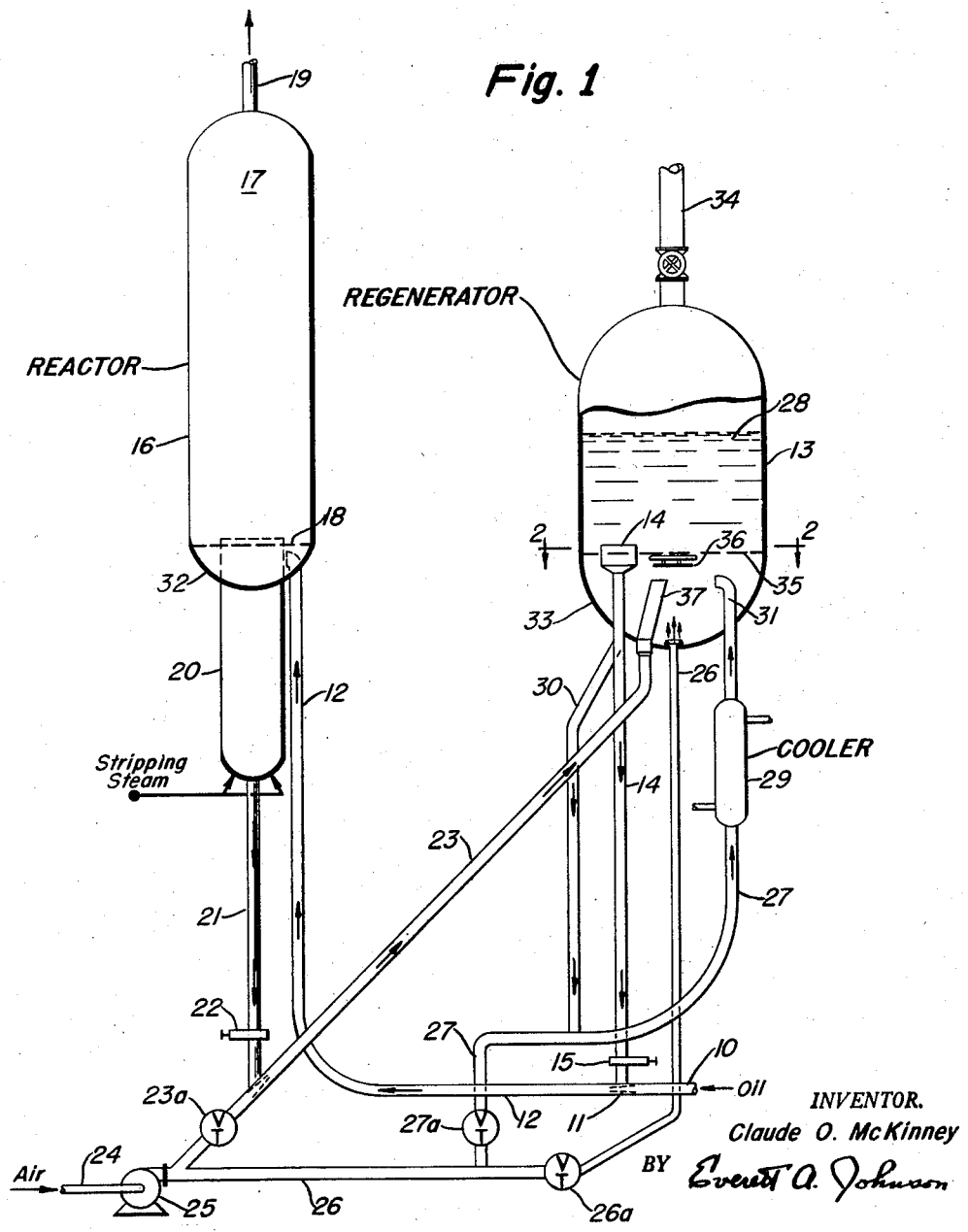

INVENTOR.
Claude O. McKinney
BY Everett A. Johnson
ATTORNEY

United States Patent Office 2,862,798
Patented Dec. 2, 1958

2,862,798

FLUIDIZED CATALYST REGENERATION SYSTEM

Claude O. McKinney, Hammond, Ind., assignor to Standard Oil Company, Chicago, Ill., a corporation of Indiana Application June 11, 1954, Serial No. 436,148

2 Claims. (Cl. 23—288)

This invention relates to an improvement in fluid catalyst regeneration systems and it pertains more particularly to an improved method and means for increasing the capacity of a regenerator system.

In conventional fluidized solids systems such as catalytic cracking units a compressor must provide compressed air for introducing spent catalyst below the distributor grid in the regenerator, provide the supplemental air required for effecting necessary combustion and, in some instances, provide the air required for recycling catalyst through coolers. An object of this invention is to increase the effective capacity of a regenerator without increasing the size of the compressor or the compressor load. A further object of the invention is to provide a method and means for decreasing the work required for introducing the spent catalyst into the regenerator and utilizing the resulting savings in energy for increasing the amount of supplemental air introduced without increasing over-all compressor costs. An ultimate object is to provide a simple inexpensive alteration in regenerator design which will enable throughput in a catalytic cracking unit to be increased by as much as 8 to 10 percent. Other objects will be apparent as the detailed description of the invention proceeds.

A conventional regenerator is provided with a distributor grid and with a bottom hemispherical closure, the supplemental air being usually introduced at the bottom center of the closure and the returned spent catalyst being introduced at the base of the closure adjacent the supplemental air. I have discovered that by the simple expedient of extending the spent catalyst inlet line upwardly in the hemispherical closure to a point just below the distributor grid and providing suitable deflecting baffles to avoid erosion of the grid, the work required for introducing the spent catalyst is markedly reduced. With the same amount of carrier air, the inlet pressure of the carrier air may be decreased a substantial amount which may be of the order of 2 to 4 pounds per square inch in the case of large diameter vessels. With the lower pressure requirement for introducing spent catalyst below the distributor grid in the regenerator, less throttling is required on that portion of the compressed air which is introduced as supplementary air at the base of the hemispherical closure so that with no change in compressor or input energy and at constant dilute phase pressure in the regenerator, a larger amount of additional air may be supplied to the regenerator. In a 25,000 barrel per day unit employing a regenerator operating at a discharge pressure of about 15.4 p. s. i. g., the amount of supplementary air delivered at constant compressor speed is increased by as much as about 20,000 pounds per hour. Such increased air rate increased regenerator burning capacity by about 8 to 10% and since the burning capacity usually determines the effective capacity of a unit, the throughput in a 25,000 barrel per day unit is increased by approximately 2500 barrels per day at essentially unchanged conversion level and regenerator pressure. Likewise, for maintaining a given air rate the steam requirements for the compressor can be reduced when employing my invention.

The invention will be more clearly understood from the following description of a specific example read in conjunction with the accompanying drawings which form a part of this specification and in which:

Figure 1 is a schematic elevation of a reactor-regenerator system employing my invention;

Figure 4:
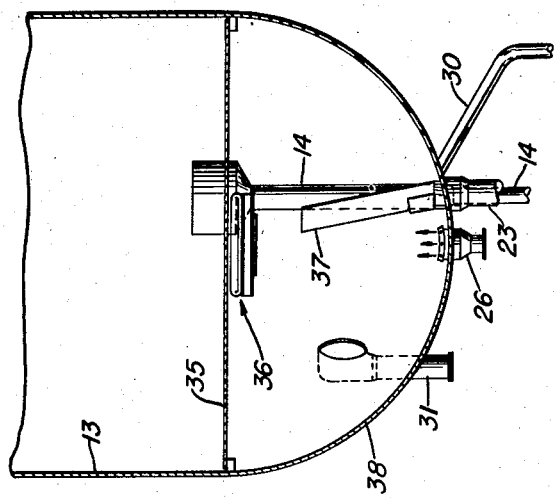
Figure 4 is a section taken along the line 4—4 in Figure 2.
Figure 3:
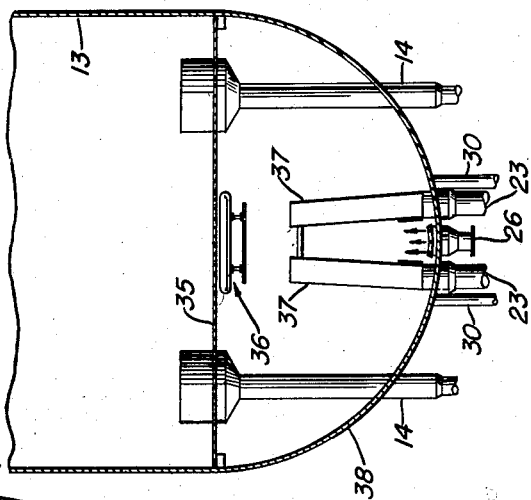
Figure 3 is a section taken along the line 3—3 in Figure 2.
Figure 2:
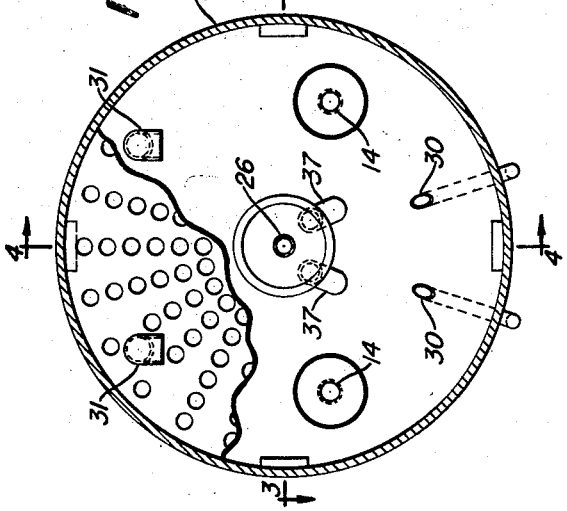
Figure 2 is a section taken along the line 2—2 in Figure 1.

In the catalytic cracking system described in this example, the partially vaporized gas oil feed stream (approximately 40 percent vaporized) introduced by line 10 flows to the oil injector nozzles 11 in carrier lines 12. Here the feed is injected into a stream of hot regenerated catalyst flowing downwardly from the regenerator 13 through regenerated catalyst standpipes 14 and the regenerated catalyst slide valves 15. The quantity of circulating catalyst is about 7 pounds of catalyst per pound of oil which furnishes the additional heat required to completely vaporize and crack the oil feed.

The mixture of oil and catalyst passes upwardly through the carrier lines 12 into the reactor 16. The catalytic cracking occurs both in the carrier lines 12 en route to the reactor 16 and in the reactor 16 itself. The catalyst settles from the products of reaction in reactor 16 forming a fluid bed 17 which is maintained in this condition by the upward flow of the entering vapors through the grid 18. The depth of the fluidized catalyst bed 17 can be controlled and this factor, along with the activity of the catalyst as well as temperature, governs the cracking intensity. From the reactor 16, cracked vapors pass overhead via transfer line 19 to a fractionation system (not shown) where they are separated into the various product streams, such as gas, gasoline, and light and heavy cycle gas oils.

The spent catalyst flows downwardly from the fluid bed 17 in the reactor 16 through a steam-stripping section 20 where most of the volatile hydrocarbons entrained in or adhering to the particles of catalyst are removed. The stripped spent catalyst then flows down through two spent catalyst standpipes 21 and slide valves 22, there being two standpipes 21 on each reactor 16. The valves 22 control catalyst flow into the spent catalyst carrier lines 23 where it is dispersed into a stream of carrier air introduced by line 24 and compressor 25. One function of the compressor 25 is to provide the lift gas and the energy for carrying the catalyst to the regenerator. Additional or supplementary air, over and above that required for the carrier lines 23, is needed to burn off the coke, and at least a portion of this air is admitted to the regenerator 13 through a separate connection 26 in amounts permitted by throttle valve 26a at the bottom of the regenerator 13. The remainder of the air required for regeneration is injected as carrier air into the recycle catalyst cooler carrier lines 27.

Catalyst is circulated by circulation standpipes 30 from the regenerator bed 28 and carrier lines 27 through the recycle catalyst coolers 29 and return line 31 to control regenerator bed temperature. Cooling is accomplished by the generation of steam from boiler feed water on the shell side of the recycle coolers 29.

The contact with air in the regenerator 13 burns enough of the coke deposit off the catalyst to restore its activity. A bed 28 of regenerated catalyst is maintained in the regenerator 13 as in the reactor 16, except that in this case the fluidity of the bed 28 is maintained by the flow of introduced air and generated flue gas passing upwardly therethrough. Regenerated catalyst from which most of the coke has been removed is withdrawn from the bed 28 and passes downward through two regenerated catalyst standpipes 14, through slide valves 15 and into the regenerated catalyst carrier lines 12 where it is again dispersed and mixed with a small amount of steam and the partially vaporized oil stream as hereinabove described.

The regenerator 13, in this example, is forty feet high measured along the straight wall of the vessel, i. e., forty feet between the top and bottom closures, and about thirty-eight feet in diameter. It is preferably lined with refractory concrete on steel mesh. The fluidized catalyst bed 28 may extend about sixteen to eighteen feet above grid 35 with a vapor velocity through the bed at a rate between about 1.25 and 1.75 feet per second. Usually the regenerator temperature is about 1090° F. and the pressure at the top of the regenerator is about 15.4 p. s. i. g. although, obviously, these conditions may be varied. The bottom of the hemispherical base 33 of the regenerator is, of course, about nineteen feet below the grid 35.

As initially constructed and operated, transfer lines 23, which are about two feet in diameter, terminated at the base of the hemispherical bottom adjacent the supplemental air inlet. The catalyst density in catalyst transfer lines 23 is about 3.5 pounds per cubic foot; the carrying gas velocity is about thirty feet per second. With the compressor operating at design capacity in this initially constructed system to deliver 37,000 pounds per hour of air through line 24 to transfer lines 23 and 33,000 pounds per hour to cooler recycling lines 27, only about 100,000 pounds per hour of air was available for introduction through auxiliary air inlet 26.

In accordance with my invention, the catalyst transfer lines 23 are extended by the addition of terminal ducts 37 to a point adjacent, i. e., about three to five feet, from grid 35. In this example, the terminal ducts 37 extend obliquely within hemispherical head 33 toward the center of grid 35 and discharge against baffle 36, the function of which is to prevent erosion of the grid and to effect distribution of the introduced solids. This baffle, of course, must be spaced from the distributor grid at a sufficient distance to avoid impairment of the latter's function and it is preferably suspended below the distributor grid. By this simple expedient of adding terminal ducts 37 so that carrier lines 23 are, in effect, discharging adjacent the grid instead of at the bottom of the hemispherical closure, it has been found that the amount of auxiliary air introduced through line 26 is increased to about 120,000 pounds per hour without any increase on compression size or compressor energy input. With the added ducts 37 in the system it was found that throttle valve 26a could be opened to a considerable extent since less pressure was required at the inlet end of transfer line 23 and less energy was required in returning the spent catalyst to the regenerator.

Thus, by the simple expedient of adding extensions to the transfer line conduits upwardly within the hemispherical bottom of the regenerator, the regenerator capacity in this example was increased by eight percent which, in turn, means that the throughput of the unit is increased by eight percent at essentially unchanged conversion level. Further, the carbon on regenerated catalyst stayed at the same low level before and after the improvement in the catalyst transfer line, the burning rate apparently not being adversely affected to any determinable extent.

In the above example, extensions were provided to the spent catalyst carrier lines within the hemispherical closure in an existing catalytic cracking unit. In a newly designed unit the advantages of this invention may be obtained by originally extending the spent catalyst return lines upwardly within the bottom closure of the regenerator to the upper part of the space in this bottom closure and usually so that it will terminate about three to five feet below the grid or distributor, a deflecting baffle being placed below the grid to prevent erosion and effect catalyst distribution. With this extension of the spent catalyst carrier line, the desired air rate in the regenerator may be obtained with a smaller compressor and with less compression cost than has heretofore been required.

Although the invention has been described with reference to a specific example, modifications in the construction and operating techniques will be apparent from the foregoing description to those skilled in the art.

I claim:

1. An improved catalyst distribution system for use in supplying spent catalyst and regenerating gases to a regenerator chamber which comprises in combination a vertically elongated contacting vessel, a distribution grid across the flow area of such vessel and vertically spaced from the bottom of said vessel thereby providing a distribution chamber below the regenerator chamber, first duct means supplying gasiform fluids and solids to said distribution chamber, said duct means comprising dual ducts projecting through the bottom of said chamber and discharging below the grid and in proximity thereto, a baffle means fixed to said grid and substantially in alignment with the said duct means, said dual ducts discharging gasiform fluids and catalyst onto said baffle, second duct means supplying auxiliary gasiform fluid to said distribution chamber near the bottom thereof and adapted to resuspend solids deflected by said baffle, said second duct and said baffle being in substantially vertical alignment, a third duct means discharging laterally into said distribution chamber in the upper part thereof below said baffle, a cooler on said third duct means, and fourth duct means conveying catalyst downwardly from said distribution chamber into said third duct means whereby catalyst is cooled and recirculated to the distribution chamber.

2. The catalyst distribution system of claim 1 wherein said baffle means is arranged centrally of and suspended from said grid and said dual ducts terminate three to five feet below said grid whereby the introduced catalyst is deflected laterally and resuspended in auxiliary gasiform fluid introduced by said second duct means.

References Cited in the file of this patent

UNITED STATES PATENTS

| | | |
|---|---|---|
| 2,461,172 | Pelzer | Feb. 8, 1949 |
| 2,470,395 | Gohr | May 17, 1949 |
| 2,550,922 | Gullette | May 1, 1951 |
| 2,581,670 | Kassel | Jan. 8, 1952 |
| 2,620,313 | Odell | Dec. 2, 1952 |
| 2,662,813 | Packie | Dec. 15, 1953 |
| 2,687,343 | Crask et al. | Aug. 24, 1954 |
| 2,715,018 | Lapple | Aug. 9, 1955 |